Figure 1:
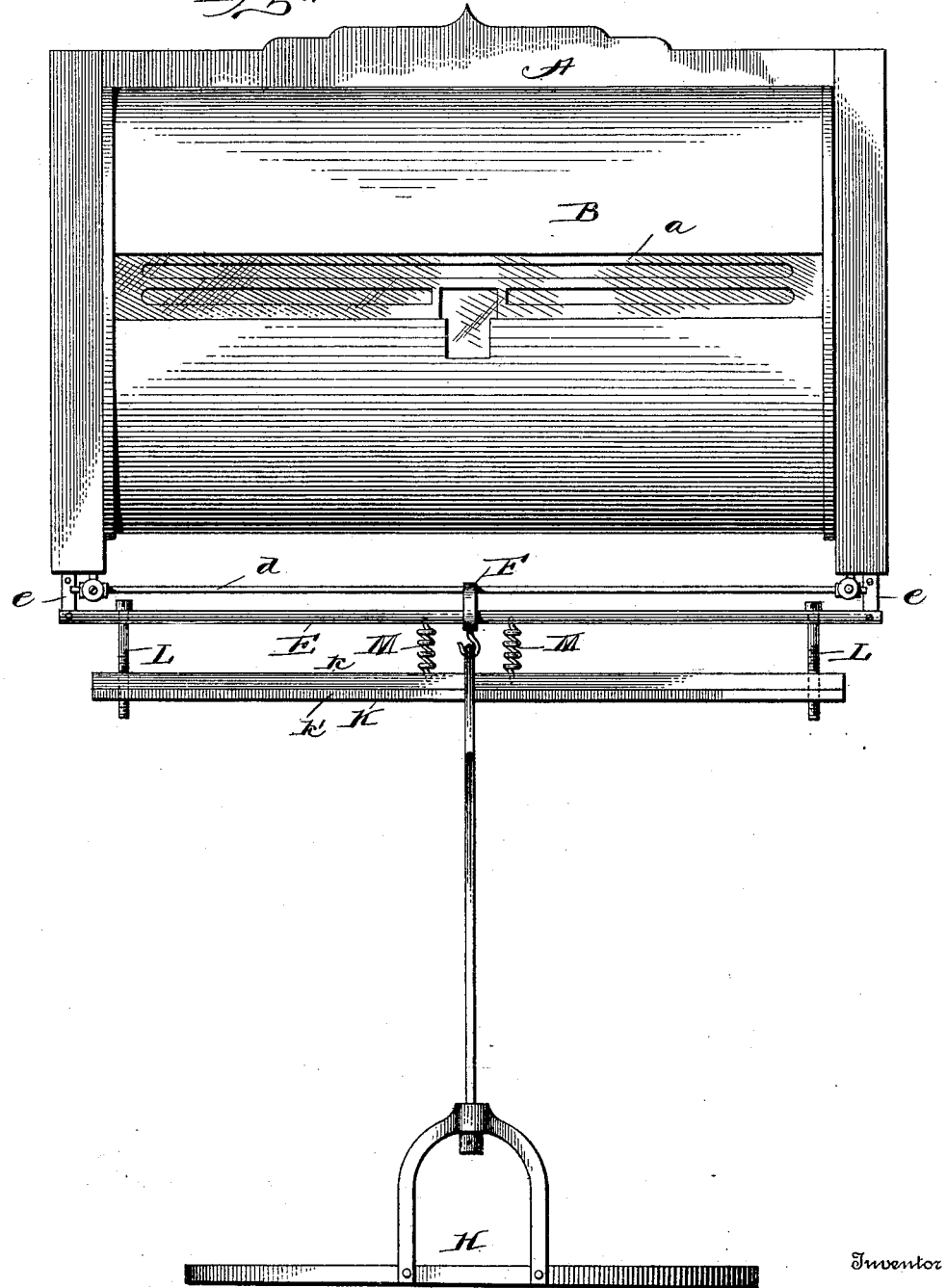

No. 648,289. Patented Apr. 24, 1900.
A. N. OZIAS.
SPRING BALANCE SCALE.
(Application filed Nov. 24, 1899.)
(No Model.) 2 Sheets—Sheet 2.

Witnesses Inventor
Albert N. Ozias
By Church & Church
his Attorneys

UNITED STATES PATENT OFFICE.

ALBERT N. OZIAS, OF MINNEAPOLIS, MINNESOTA, ASSIGNOR TO THE COMPUTING SCALE COMPANY, OF DAYTON, OHIO.

SPRING-BALANCE SCALE.

SPECIFICATION forming part of Letters Patent No. 648,289, dated April 24, 1900.

Application filed November 24, 1899. Serial No. 738,223. (No model.)

*To all whom it may concern:*

Be it known that I, ALBERT N. OZIAS, a citizen of the United States, residing at Minneapolis, in the county of Hennepin and State of Minnesota, have invented certain new and useful Improvements in Spring-Balance Scales; and I do hereby declare the following to be a full, clear, and exact description of the same, reference being had to the accompanying drawings, forming a part of this specification, and to the letters of reference marked thereon.

In scales designed for weighing either in units of weight or in units of value and dependent upon the power of a spring or springs for counterbalancing the weight of the load great difficulty has been experienced in securing accuracy and uniformity in action. The inaccuracy and want of uniformity are due in a large measure to contraction and expansion in the working parts of the scale, and particularly in the springs, occasioned by variations in the temperature of the surrounding air. This is especially so where a coil spring or springs are employed, as in such springs a relatively-long length of wire is necessarily employed, and a slight variation in temperature will cause said wire to expand or contract to a considerable extent. Thus in warm weather the spring is longer than in cold weather, and consequently in warm weather a given load will distort the spring to a greater degree than in cold weather. Mechanical appliances have been employed for permitting of an adjustment to in a measure compensate for variation; but it is the object of my present invention to provide a scale which will automatically adjust itself so as to compensate for and produce uniform results at all temperatures within the range of ordinary atmospheric changes. To accomplish this result, I make use of a thermostatic regulator which will neutralize the differential effective action of the spring due to differences in temperature. Thus the invention may be said to consist, broadly, in the employment, in a spring-balance scale, of a compensating thermostatic device for accomplishing the ends stated; and more specifically the invention may be said to consist in certain novel details of construction and combinations and arrangements of parts, all as will be now described, and the particular features of novelty pointed out in the appended claims.

For illustrating the practical application of the invention I have adopted a form of spring-balance scale which is now in common use, and embodies a drum adapted to be rotated by the movement of a load-carrier, such movement being resisted by coil-springs, which counterbalance the load-carrier, together with its load, although it will be understood that the invention in its broader aspect is applicable generally to all varieties of spring-balance scales, and hence I do not wish to be limited either to the particular form of scale adopted for illustrative purposes nor to any other particular form of scales.

Figure 2:
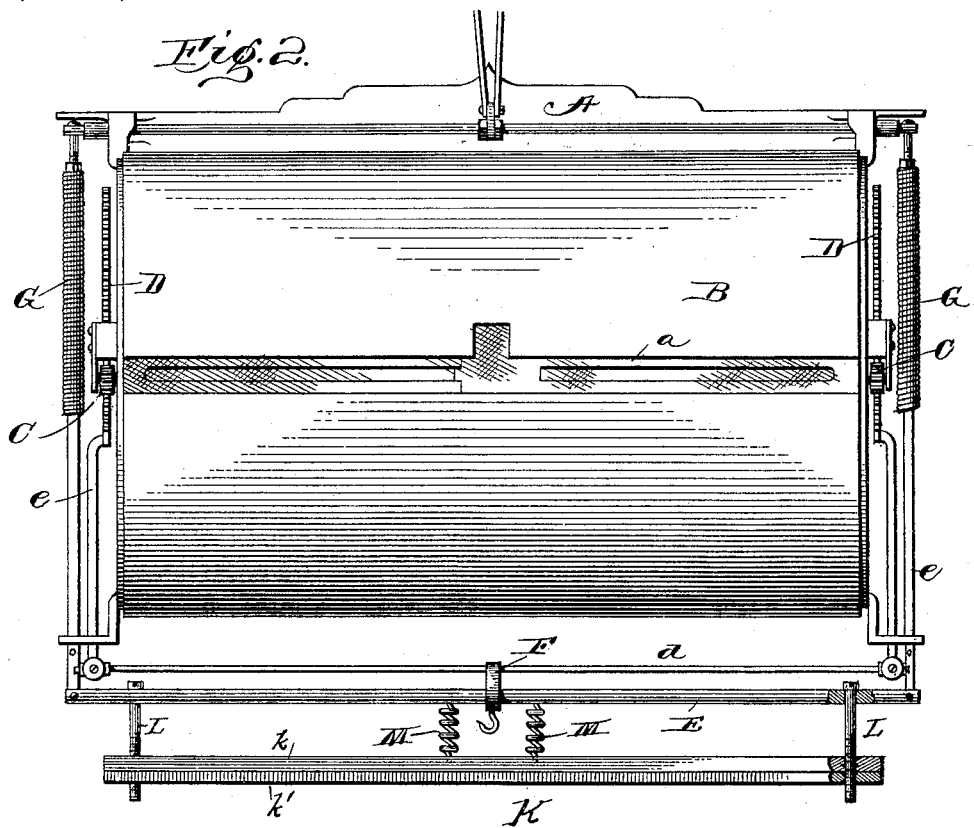
Figure 3:
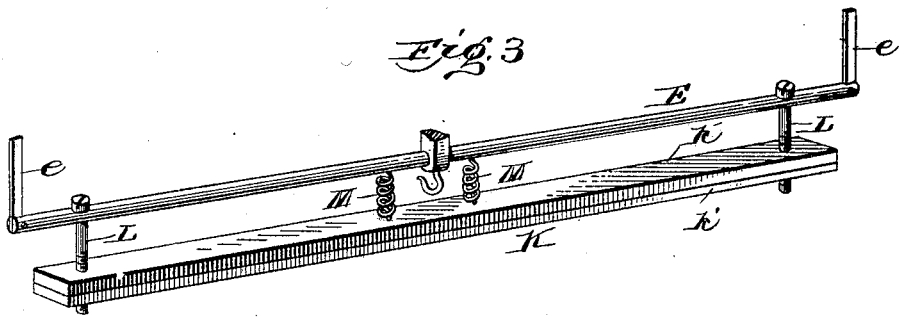

Referring to the accompanying drawings, Figure 1 is a front elevation of a spring-balance scale embodying my present improvements. Fig. 2 is a similar view with portions of the casing and load-receiver removed. Fig. 3 is a detail perspective view of the compensating thermostatic regulator.

Similar letters of reference in the several figures indicate the same parts.

In the scale illustrated a frame or casing A is provided, adapted to be suspended in any suitable manner, and in which frame or casing there is journaled a drum B, preferably on a horizontal axis and adapted to bear suitable indicating marks or graduations (not shown) which will be exposed through apertures $a$ in the casing. The ends of the spindle which support the drum are provided with pinions C, with which mesh rack-bars D, extending down below the casing and connected together by a cross-bar $d$. This cross-bar is preferably somewhat elastic in order to prevent undue shock to the mechanism in starting or coming to rest, and at its center it is connected with a second bar E by means of a block or load-support F. The ends of the bar E are connected with the counterbalancing-springs G, preferably through the medium of connecting-rods $e$, whereby the parts are held in their normal position, but may be moved against the tension of said springs by the application of weight to the load-support F. For convenience in the application of the load a load-receiver H is preferably suspended from the load-support F in any approved manner.

In the act of weighing with a scale of this pattern the bar E is acted on by force tending to produce a downward curvature, and this downward curvature will be proportional to the amount of weight placed on the load support or pan, which flexure will be substantially uniform at all temperatures. By providing means whereby when the springs are elongated by the rising temperature the bar E will be stiffened or given an upward flexure in the center, or vice versa, the error due to the variation in the length of the counterbalancing-springs by changes in temperature may be effectually neutralized. For accomplishing this I provide a thermostatic regulator-bar K, in its simplest embodiment composed of metals having different coefficients of expansion—as, for instance, brass $k$ and steel $k'$—which thermostat is connected at its opposite ends with the horizontal bar E, preferably by rigid but adjustable connections—such, for instance, as the set-screws L—while at the center a connection is interposed between the thermostat and bar E. This connection is preferably a yielding connection and formed by a coil spring or springs M, interposed between the thermostat and bar E. In the arrangement shown the thermostat is located below the bar E, and the brass or more highly-expansible metal constitutes the upper portion of the thermostat. Thus when the temperature of the surrounding air rises, thereby causing the counterbalancing-springs to elongate, the tendency of the thermostat is to curve upwardly at the center, thereby tending to give the bar E an upward flexure, or, what is equivalent thereto, bracing or supporting said bar against downward flexure when the load is applied thereto. Obviously the power of the thermostat must bear some proportion to the power of the springs, and the proportions must be determined empirically for scales of different capacity; but by the provision of adjustable connections between the thermostat and bar E the proportionate strength of the thermostat and counterbalancing-springs may have a wide degree of variation, and by proper adjustment the necessary calibration or sealing of the scale may be effected, so as to secure correct automatic compensation for variations in temperature.

Obviously other forms of thermostatic bars may be employed in lieu of the simple and ordinary type illustrated without departing from the spirit of my invention, and hence I do not wish to be limited specifically to the form shown.

Having thus described my invention, what I claim is—

1. In a scale, the combination with indicating mechanism, a load-support and counterbalancing-springs for the load-support and load carried thereby, of a thermostatic regulator so mounted as to neutralize the variation in the effective action of the springs on the indicator due to changes in temperature of the surrounding atmosphere, but so as to be uninfluenced in such action by the force exerted upon the springs; substantially as described.

2. In a scale, the combination of the following instrumentalities, to wit; an indicating mechanism, a load-support, and counterbalancing-springs for the load-support and load carried thereby, and a thermostatic regulator so mounted as to neutralize the effect of expansion and contraction of the springs on the indicator due to changes in atmospheric temperature, but so as to be uninfluenced in such action by the force exerted upon the springs; substantially as described.

3. In a scale, the combination with an indicating mechanism, a load-support, counterbalancing-springs for the load-support and load carried thereby, and connections between said counterbalancing-springs and indicating mechanism, of a thermostatic regulator coöperating with said connections to neutralize the differential effective action of the spring due to variation in atmospheric temperature; substantially as described.

4. In a scale, the combination with an indicating mechanism, a load-support, a counterbalancing-spring for the load-support and load carried thereby, and connections between said spring and indicating mechanism, embodying a deflectible bar, of a thermostatic regulator for deflecting said bar in opposition to the action of the load; substantially as described.

5. In a scale, the combination of the following instrumentalities, to wit, an indicating mechanism, a load-support, counterbalancing-springs for the load-support and load carried thereby, and a compensating mechanism interposed between the indicating mechanism and counterbalancing-springs and operating in opposition to the variations in the effective action of said springs due to changes in atmospheric temperature, whereby the operation of the indicating mechanism is made uniform at all temperatures; substantially as described.

6. In a scale, the combination with an indicating mechanism, counterbalancing-springs, a horizontal bar connecting said springs, and connections between said bar and indicating mechanism located centrally of the bar, of a thermostatic regulator for deflecting said bar to compensate for variations in the length of the springs due to changes in atmospheric temperature; substantially as described.

7. In a scale, the combination with an indicating mechanism, counterbalancing-springs, a horizontal bar interposed between said springs, a load-support connected with the center of said bar and connections between said bar and indicating mechanism, of a thermostatic regulator connected with said bar and operating to deflect the same under variations in atmospheric temperature, whereby the effective action of the counterbalancing-springs is made uniform at different temperatures; substantially as described.

8. In a scale, the combination with an indicating mechanism, counterbalancing-springs, a horizontal bar interposed between said springs and connected centrally with the indicating mechanism, of a thermostatic regulator connected with the opposite ends of said bar and connections interposed between the center of said bar and thermostatic regulator; substantially as described.

9. In a scale, the combination with an indicating mechanism, counterbalancing-springs, a horizontal bar interposed between said springs, connections between the center of said bar and indicating mechanism, and a load-support applied to said bar, of a thermostatic regulator, connections between the ends of said bar and thermostat and centrally-arranged springs interposed between said bar and thermostat; substantially as described.

10. In a scale, the combination with an indicating mechanism, counterbalancing-springs, a horizontal bar interposed between said springs, connections between the center of said bar and indicating mechanism and the load-support, of a thermostatic regulator and adjustable connections between said thermostatic regulator and bar; substantially as described.

11. In a scale, the combination with an indicating mechanism, counterbalancing-springs, a horizontal bar interposed between said springs, connections between the center of said bar and indicating mechanism and a load-support, of a thermostatic regulator, adjustable connections between the end of said thermostat and bar and springs interposed between the center of said bar and thermostat; substantially as described.

ALBERT N. OZIAS.

Witnesses:
SADIE S. RONEY,
E. G. DICKINSON.